United States Patent
Laubenthal et al.

(10) Patent No.: US 8,905,201 B2
(45) Date of Patent: Dec. 9, 2014

(54) VEHICLE DISC BRAKE

(75) Inventors: Frank Laubenthal, Wirfus (DE); Dirk Hees, Mayen (DE); Guido Zenzen, Macken (DE)

(73) Assignee: Lucas Automotive GmbH, Koblenz (DE)

( * ) Notice: Subject to any disclaimer, the term of this patent is extended or adjusted under 35 U.S.C. 154(b) by 413 days.

(21) Appl. No.: 13/055,209

(22) PCT Filed: Jul. 21, 2009

(86) PCT No.: PCT/EP2009/005286
§ 371 (c)(1),
(2), (4) Date: Feb. 16, 2011

(87) PCT Pub. No.: WO2010/009864
PCT Pub. Date: Jan. 28, 2010

(65) Prior Publication Data
US 2011/0127121 A1 Jun. 2, 2011

(30) Foreign Application Priority Data
Jul. 23, 2008 (DE) .......................... 10 2008 034 300

(51) Int. Cl.
| | |
|---|---|
| *F16D 65/14* | (2006.01) |
| *F16D 55/227* | (2006.01) |
| *F16D 55/2265* | (2006.01) |
| *F16D 65/18* | (2006.01) |
| *F16D 121/02* | (2012.01) |
| *F16D 121/24* | (2012.01) |
| *F16D 123/00* | (2012.01) |

(52) U.S. Cl.
CPC ........ *F16D 55/227* (2013.01); *F16D 55/22655* (2013.01); *F16D 65/18* (2013.01); *F16D 2121/02* (2013.01); *F16D 2121/24* (2013.01); *F16D 2123/00* (2013.01)
USPC ................... 188/73.45; 188/72.6; 188/73.39; 188/73.43

(58) Field of Classification Search
USPC ............ 188/72.6, 73.39, 73.43, 73.45, 73.46
See application file for complete search history.

(56) References Cited

U.S. PATENT DOCUMENTS

| | | | |
|---|---|---|---|
| 3,298,468 A | 1/1967 | Buyze | |
| 4,219,106 A | 8/1980 | Lüpertz et al. | |

(Continued)

FOREIGN PATENT DOCUMENTS

| | | |
|---|---|---|
| DE | 1238284 B | 4/1967 |
| DE | 1505491 A1 | 9/1969 |

(Continued)

*Primary Examiner* — Thomas J Williams (74) *Attorney, Agent, or Firm* — MacMillan, Sobanski & Todd, LLC (57) ABSTRACT

Vehicle disk brake designed as a service brake and as a parking- or immobilizing brake, having a brake anchor plate, which is to be fastened to the chassis of a motor vehicle by at least one screw bolt and in which two guide bolts are accommodated in order to guide a brake caliper displaceably relative to the brake anchor plate, and having a hydraulic chamber, in which a brake piston is accommodated in order to bring friction linings into and out of frictional engagement with a brake disk. A separately manipulable assembly is built onto the vehicle disk brake and has an electric motor as well as an electronic control and power device in order, independently of a hydraulic actuation of the brake piston, to actuate the brake piston via a rotary-to-linear motion converter in the sense of bringing the friction linings into and out of engagement with the brake disk. In order to create the extra space required by the use of a smart actuator for the parking brake unit in the internal wheel contour of compact vehicles, modifications to existing and tried-and-tested components are undertaken, which simultaneously improve the accessibility for maintenance purposes.

10 Claims, 10 Drawing Sheets

(56) References Cited

U.S. PATENT DOCUMENTS

| | | | |
|---|---|---|---|
| 4,350,229 A * | 9/1982 | Ito et al. | 188/73.45 |
| 4,355,707 A | 10/1982 | Saito | |
| 4,732,242 A * | 3/1988 | Heibel | 188/73.45 |
| 5,109,959 A * | 5/1992 | Kondo et al. | 188/73.39 |
| 5,620,064 A * | 4/1997 | Sano | 188/73.45 |
| 5,769,189 A | 6/1998 | Heibel et al. | |
| 5,931,267 A * | 8/1999 | Iwata et al. | 188/73.45 |
| 6,182,801 B1 * | 2/2001 | Yoshida et al. | 188/73.45 |
| 6,394,235 B1 | 5/2002 | Poertzgen et al. | |
| 6,851,524 B2 * | 2/2005 | Takeda et al. | 188/73.39 |
| 2003/0083797 A1 * | 5/2003 | Yokoyama et al. | 303/20 |
| 2004/0016609 A1 | 1/2004 | Takeda et al. | |
| 2005/0217951 A1 | 10/2005 | Iwasaki | |
| 2007/0068746 A1 * | 3/2007 | Chittka | 188/72.6 |
| 2008/0283345 A1 * | 11/2008 | Balz et al. | 188/72.6 |

FOREIGN PATENT DOCUMENTS

| | | |
|---|---|---|
| DE | 1575920 A1 | 1/1970 |
| DE | 2211013 A1 | 9/1973 |
| DE | 2845404 A1 | 5/1979 |
| DE | 2804808 A1 | 8/1979 |
| DE | 4115064 A1 | 12/1992 |
| DE | 4416815 A1 | 11/1995 |
| DE | 10113347 A1 | 12/2001 |
| EP | 0729871 A1 | 9/1996 |
| EP | 0996560 B1 | 5/2000 |
| WO | WO 8403338 A1 * | 8/1984 |
| WO | 2007039922 A1 | 4/2007 |

* cited by examiner

VEHICLE DISC BRAKE

CROSS-REFERENCE TO RELATED APPLICATIONS

This application is a national stage of International Application No. PCT/EP2009/005286 filed Jul. 21, 2009, the disclosures of which are incorporated herein by reference in entirety, and which claimed priority to German Patent Application No. 10 2008 034 300.5 filed Jul. 23, 2008, the disclosures of which are incorporated herein by reference in entirety.

BACKGROUND OF THE INVENTION

A vehicle disk brake has a brake anchor plate, which is to be fastened to the chassis of a vehicle, and a caliper or frame, which is held by the brake anchor plate and in which are accommodated friction linings that are pressed against a rotating brake disk.

Brakes of this type are generally known. The friction linings, consisting of supporting plate and friction layer, are conventionally guided axially in relation to the brake disk by means of bolts fastened to the brake anchor plate. "Axially" in the case of disk brakes generally means: in a direction parallel to the axis of rotation of the brake disk. "Radially" accordingly means a direction at right angles to an axial direction in the above sense. The brake anchor plate is in turn fastened to the wheel bearing.

The prior art of such vehicle brakes in the form of disk brakes is represented for example by the following documents: DE 1 238 284, DE 1 505 491, and corresponding U.S. Pat. No. 3,298,468 A, both of which are incorporated by reference herein in entirety, DE 1 575 920, DE 2 804 808, and corresponding U.S. Pat. No. 4,219,106 A, both of which are incorporated by reference herein in entirety, DE 2 845 404, DE 41 15 064 and DE 4 416 815, DE 101 13 347 A1, DE 41 15 064 A1 and DE 2211013 A, EP 0 729 871 A1, and corresponding U.S. Pat. No. 5,769,189 A, both of which are incorporated by reference herein in entirety.

In such vehicle disk brakes the friction lining is pressed by means of a brake piston by hydraulic pressure against a brake disk in order to brake the rotation thereof. For this purpose, hydraulic pressure is introduced under pressure into a hydraulic chamber, one boundary wall of which is formed by the brake piston. The pressure in the hydraulic chamber then leads to the displacement of the brake piston and hence of the friction lining in the direction of the brake disk.

In order that such a vehicle disk brake may be used not only as a service brake but also as an immobilizing brake—also known as parking brake, it is equipped with an additional actuator, which in the stationary state of the vehicle brings and keeps the friction linings in engagement with the brake disk. In this case, increasing use is being made of electric parking brakes that may be operated with so-called smart actuators. Here, as a rule by a smart actuator is meant an assembly that comprises an electric motor, optionally with a gear that reduces the rotational speed (and hence increases the torque) as well as an associated electronic control and power device. This assembly is mostly supplied by means of a LIN-, CAN-, or MOST bus, or in some other way with (immobilize, release, hold, etc.) control signals. However, because of the additional electronic components, the size of this assembly may be larger than that of a conventional actuator having an electric motor, the driving circuits of which are disposed spatially remote from it.

The vehicle disk brake for optimum space utilization is to be fitted as precisely as possible into the internal wheel contour. The available space is limited in this case by the additional parking brake unit. An added factor is that the parking brake unit built onto the brake caliper restricts access to the guide bolts for the brake linings and/or for the fastening bolts of the vehicle disk brake on the chassis. This makes assembly/disassembly more difficult. These circumstances arise in a particularly pronounced manner in compact vehicles with their smaller wheel diameters (for example 14 inches-17 inches). For this reason, in this category of vehicle it has previously hardly been possible to fit the electric parking brake and provide the gain in comfort associated therewith, for example during a hill start.

BRIEF SUMMARY OF THE INVENTION

A feature of the vehicle brakes presented here is to alleviate or solve these problems.

As a solution to the problems, vehicle disk brakes having the features of the independent claims are proposed.

The vehicle disk brake has a brake anchor plate, which is to be fastened to the chassis of a motor vehicle by means of at least one screw bolt. In the brake anchor plate two guide bolts are accommodated in order to guide a brake caliper displaceably relative to the brake anchor plate.

A brake anchor plate is to be fastened to the chassis of a motor vehicle by means of at least one screw bolt. In the brake anchor plate two guide bolts are accommodated in order to guide a brake caliper displaceably relative to the brake anchor plate. An actuator is used to bring friction linings into and out of frictional engagement with a brake disk. A separately manipulable assembly that is built onto the vehicle disk brake has an electric motor in order via a rotary-to-linear motion converter to actuate the actuating element in the sense of bringing the brake linings into and out of frictional engagement with the brake disk. A location hole for one of the two guide bolts of the brake caliper and/or for one of the two fastening bolts of the brake anchor plate is closer in radial direction to the axis of rotation of the brake disk than a location hole for the other guide bolt and/or the other fastening bolt.

The service brake may be a hydraulic service brake. The actuator may comprise a hydraulic chamber, in which a brake piston is accommodated. In the hydraulic chamber a brake piston may be accommodated in a sealing and axially longitudinally displaceable manner. To supply the hydraulic chamber with hydraulic fluid a brake pressure generating unit may be used, for example a brake booster/master cylinder unit that is actuable via a brake pedal. An actuation of the brake pressure generating unit may pressurize the hydraulic fluid in the hydraulic chamber. As a result of this, the brake piston may shift axially in order to bring friction linings into frictional engagement with a brake disk. When actuation of the brake pressure generating unit is terminated, hydraulic fluid may flow out of the hydraulic chamber back in the direction of the brake pressure generating unit, with the result that the brake piston shifts back again in order to disengage the friction linings and the brake disk.

In the assembly built onto the vehicle disk brake an electronic control and power device may be at least partially accommodated for supplying the electric motor with control and/or power signals. Thus, the vehicle disk brake may not only perform the previously described function of a (hydraulic) service brake but may also be used as a parking- or immobilizing brake. This assembly has an electric motor as well as an associated electronic control and power device and optionally a gear. It is used, independently of the (hydraulic) actuation of the brake piston, to actuate the brake piston via a rotary-to-linear motion converter, for example a spindle/nut arrangement, in the sense of bringing the brake linings into and out of frictional engagement with the brake disk. In this case, the rotary-to-linear motion converter may be likewise associated with the assembly, or may be separate therefrom. In either case, it is disposed downstream of the electric motor or, where provided, downstream of the gear.

The gear has a high overall reduction ratio (for example ca. 100 to 200:1) of the rotational speed so that the electric motor may be selected relatively small and yet a sufficiently high brake application force in the parking brake mode is ensured. The assembly is a separately manipulable subassembly that may be combined not only with the illustrated disk brake but also with other disk brakes. The electric motor in this case may be disposed in such a way that its output shaft extends approximately parallel to the axis of displacement of the brake piston and exits from the housing of the electric motor at the side remote from the brake piston. This arrangement is particularly space-saving. Alternatively, the electric motor may be disposed in such a way that its output shaft extends approximately at right angles to the axis of displacement of the brake piston.

In a first constructional variant it is then provided that the location hole for one of the two guide bolts of the brake caliper and/or for one of the two fastening bolts of the brake anchor plate is positioned closer in radial direction to the axis of rotation of the brake disk than a location hole for the other guide bolt and/or the other fastening bolt. Alternatively or in addition, the location hole for one of the two guide bolts and/or for one of the two fastening bolts may be offset in peripheral direction.

In known vehicle disk brakes four or more bolts are provided—two as guide bolts for the brake caliper on the brake anchor plate and two as fastening bolts for the brake anchor plate on the chassis—which define an, as a rule, symmetrical trapezium. In contrast to this, in the constructional variant presented here, the imaginary trapezium defined by the four bolts and/or the location holes thereof may be changed into an asymmetrical quadrangle. The desired effect that arises in this case is however that more free space is provided for the parking brake assembly in the interior of the vehicle wheel. This allows the (smart) actuator assembly, despite its having a greater volume than conventional parking brake assemblies, to be fitted also on vehicle disk brakes in the wheels of compact vehicles. Furthermore, the outlay for modifying the components of conventional vehicle disk brakes is very low. By virtue of the measure described above, moreover, access to the four bolts for assembly/disassembly is moreover comfortably guaranteed. The "offsetting" of the fastening bolt in radial direction and/or also in peripheral direction on the stub axle however has the result that the mechanical interface with the chassis is to be modified by the vehicle manufacturer. One advantage of the bolt lying radially further in is that it is subject to less mechanical load; it may therefore have a smaller diameter and hence take up less space.

The extent, by which the location hole for the one guide bolt is to be positioned in radial direction closer to the axis of rotation of the brake disk than the location hole for the other guide bolt, is ca. 150% to ca. 50% of the distance of a location hole for the other guide bolt from the location hole directly adjacent thereto for a fastening bolt. By "location hole for a fastening bolt that is directly adjacent to the location hole of the other guide bolt" is meant the location hole of the fastening bolt, with which the location hole of the other fastening bolt delimits a side (and not a diagonal) of the imaginary asymmetrical quadrangle. In other words, the extent, by which the location hole for the one guide bolt is to be positioned closer in radial direction to the axis of rotation of the brake disk than the location hole for the other guide bolt, is ca. 150% to ca. 50% of the length of the side of the asymmetrical quadrangle between the location hole of the other guide bolt and the location hole directly adjacent thereto for the fastening bolt.

In a further definition of the geometry of the location holes for the guide bolts and the fastening bolts, the distance between the location hole for the one guide bolt and the location hole directly adjacent thereto for a fastening bolt is ca. 10% to ca. 50% of the distance between the location hole for the other guide bolt and the location hole directly adjacent thereto for a fastening bolt. With this dimensioning specification too, it is possible to create space for installing the parking brake unit with a smart actuator into the internal wheel contour of compact vehicles.

In another constructional variant it is provided that one of the two guide bolts and/or one of the two fastening bolts in axial direction projects to a lesser extent in axial direction than the other guide bolt, and is devised so as to serve in the absence of the other guide bolt as a pivot bearing for the brake caliper with the parking brake assembly built thereon.

Both constructional variants are clearly alternative solutions to the initially described problems of how a vehicle disk brake having an additional parking brake unit with a smart actuator is to be fitted into the internal wheel contour of compact vehicles. Both constructional variants follow the common concept, namely, by means of superficially minimal modifications to existing and tried-and-tested components of vehicle disk brakes, in the face of the confined conditions in the wheel interior of compact vehicles "to create" space for a parking brake unit with a smart actuator and at the same time improve accessibility for maintenance purposes. Closer consideration reveals that this is a clear turning away from previous design specifications. In a manner comparable to the first constructional variant this second constructional variant also facilitates access to the guide bolts for the brake linings and/or to the fastening bolts of the vehicle brake on the chassis during assembly/disassembly, despite the parking brake unit being built onto the brake caliper.

In the case of the second constructional variant it is easily possible, so long as or after the guide bolt that projects to a greater extent has been removed, to pivot the brake caliper relative to the brake anchor plate about the guide bolt that projects to a lesser extent. Access to the friction linings, for example for replacement thereof, is therefore very easily possible.

Other advantages of this invention will become apparent to those skilled in the art from the following detailed description of the preferred embodiments, when read in light of the accompanying drawings.

DETAILED DESCRIPTION OF OTHER DRAWINGS

DETAILED DESCRIPTION OF THE INVENTION

In the following figures different embodiments are represented, wherein components that are functionally identical or functionally similar to one another are denoted by identical reference characters.

Figure 1:
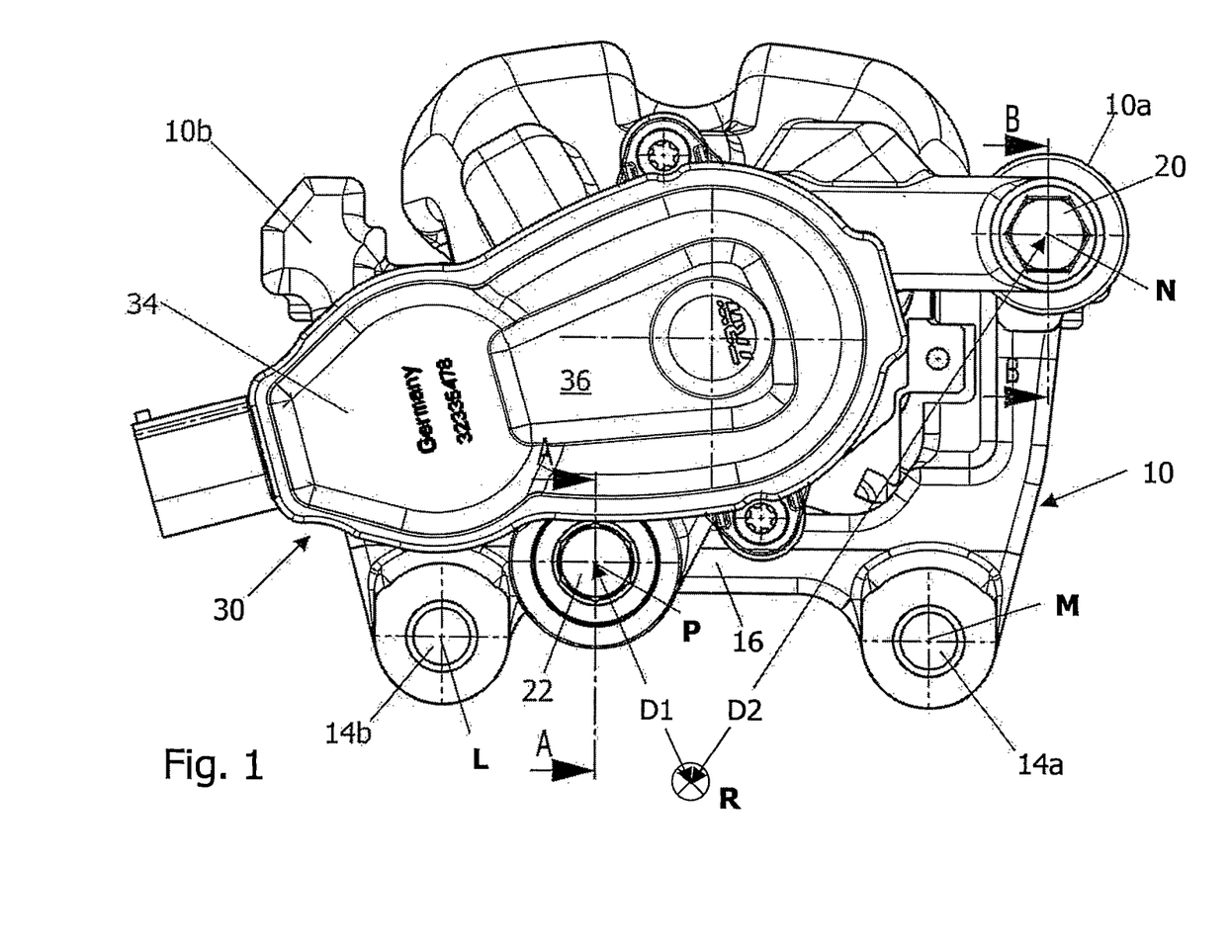
FIG. 1 is a first constructional variant of a vehicle disk brake in front view, i.e. in the mounted state seen from the outer side of the vehicle.
Figure 2:
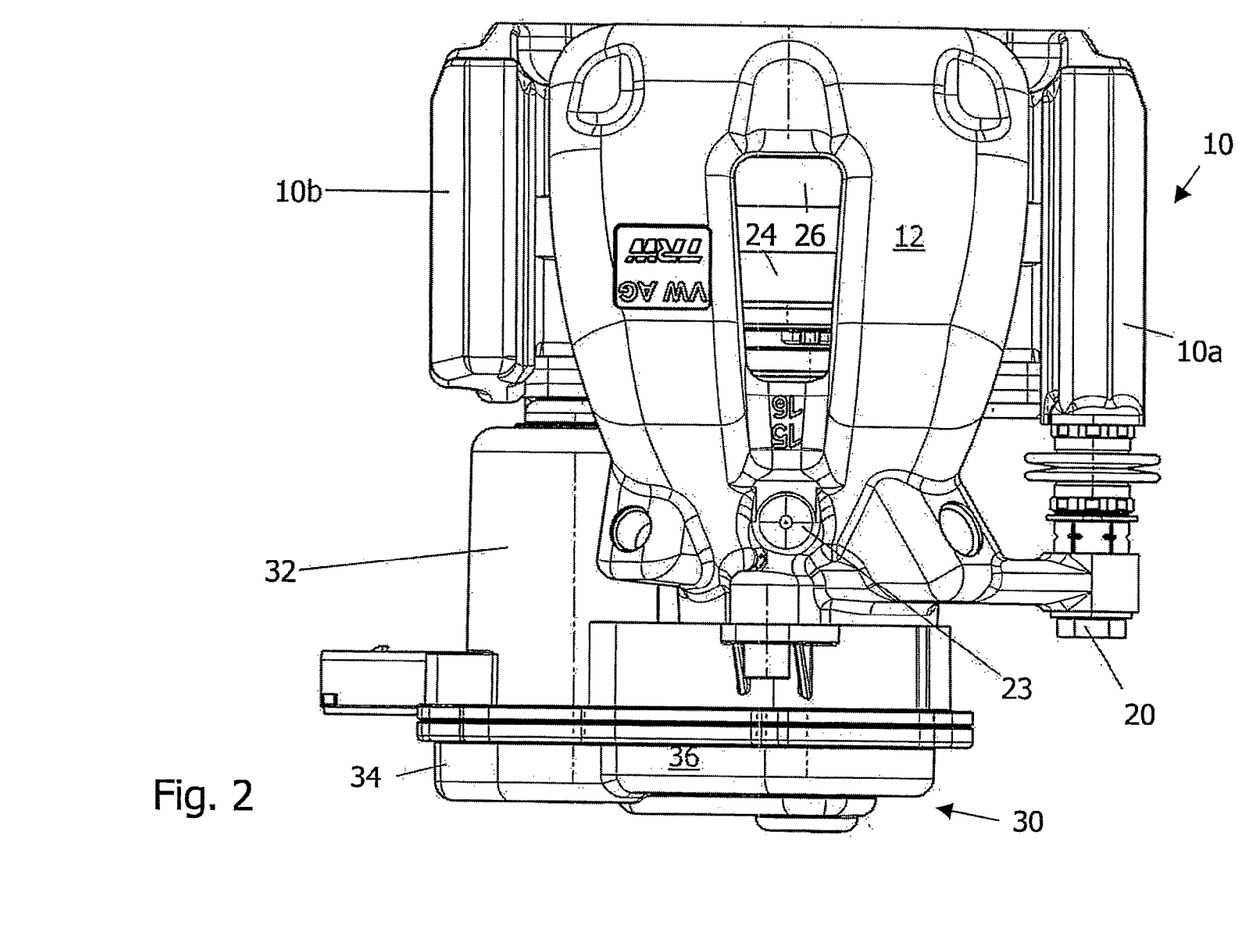
FIG. 2 is the vehicle disk brake according to FIG. 1 in plan view, from above towards the brake caliper.
Figure 3:
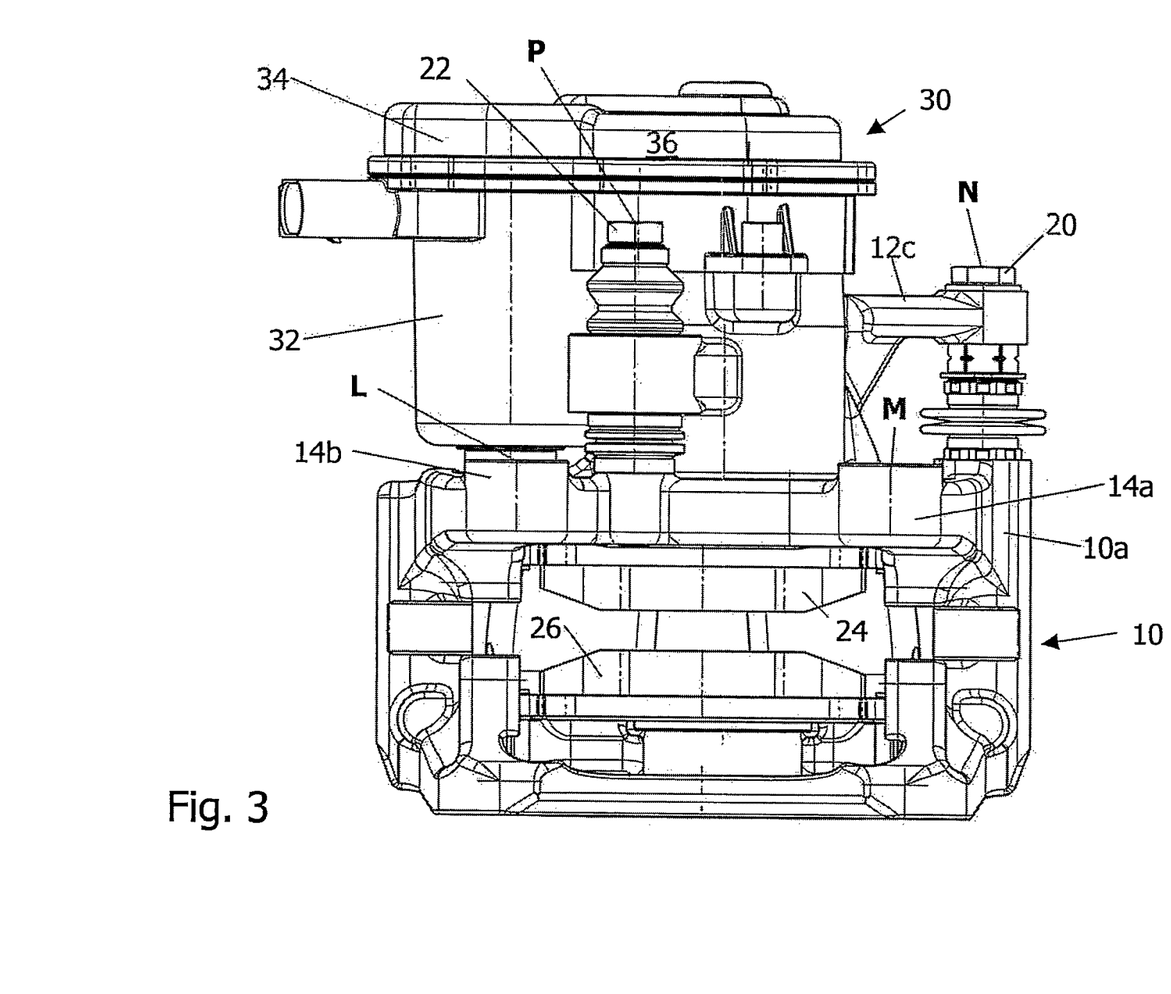
FIG. 3 is the vehicle disk brake according to FIGS. 1 and 2 from below towards the brake anchor plate.

A brake anchor plate 10 manufactured from cast steel has two arms 10a, 10b. A brake caliper 12 overlaps the brake anchor plate 10. In the represented variants the brake caliper 12 takes the form of an integral floating caliper. The brake anchor plate 10 is fastened in a fixed manner to the chassis of a motor vehicle, for which purpose two holes 14a, 14b, which are spaced apart by means of a web 16, and fastening screw bolts (not shown) are used.

In the brake anchor plate 10 two mutually spaced, substantially parallel-oriented guide bolts 20, 22 are accommodated in order to guide the brake caliper 12 relative to the brake anchor plate 10 in a longitudinally displaceable manner parallel to an axis R, wherein the axis R is the axis of rotation of a non-illustrated brake disk. Situated in the brake caliper is a non-illustrated hydraulic chamber, in which a non-illustrated brake piston is accommodated in a sealing and axially displaceable manner. For supplying the hydraulic chamber with hydraulic fluid, on the outside of the brake caliper there is a port 23, which is in communication with a non-illustrated brake pressure generating unit, for example a brake booster/master cylinder unit that is actuable via a brake pedal.

Upon an actuation of the brake pressure generating unit, the hydraulic fluid in the hydraulic chamber is pressurized, with the result that the brake piston shifts axially in order to bring friction linings 24, 26 into frictional engagement with the non-illustrated brake disk. When the actuation of the brake pressure generating unit is terminated, hydraulic fluid may flow out of the hydraulic chamber back in the direction of the brake pressure generating unit, with the result that the brake piston shifts back again in order to bring the friction linings 24, 26 out of engagement with the non-illustrated brake disk. A radially annular sealing element, which seals off the brake piston in the hydraulic chamber, assists the resetting of the brake piston by exerting an elastic resetting force on the brake piston in accordance with the "rollback" principle.

In order that the vehicle disk brake in this first constructional variant may not only perform the previously described function of a hydraulic service brake but may also be used as a parking- or immobilizing brake, a separately manipulable assembly 30 built onto the vehicle disk brake is provided. This assembly has an electric motor 32 as well as an associated integrated electronic control and power device 34 and a gear 36. This assembly 30 is used, independently of the hydraulic actuation of the brake piston, to move the brake piston via a rotary-to-linear motion converter, for example a non-illustrated spindle/nut arrangement, in the sense of bringing the brake linings into and out of frictional engagement with the brake disk. In this case, the rotary-to-linear motion converter may be associated likewise with the assembly, or may be separate therefrom. In either case, it is disposed downstream of the electric motor 32 and the gear 36. The rotary-to-linear motion converter may however also be integrated into the gear or be part of the gear 36.

The gear has an overall reduction ratio of ca. 200:1. The assembly is a separately manipulable subassembly that may be installed not only with the illustrated vehicle disk brake but also with other disk brakes. The electric motor may in this case be disposed in such a way that its output shaft extends approximately parallel to the axis of displacement of the brake piston and exits from the housing of the electric motor at the side remote from the brake piston. Alternatively, the electric motor may be disposed in such a way that its output shaft extends approximately at right angles to the axis of displacement of the brake piston. For further details of the arrangement of the vehicle disk brake reference may be made to EP 0 996 560 A1, to the subject matter of which reference is hereby made in full.

In a first constructional variant it is then provided that one of the two guide bolts—22—and/or its location hole of the brake caliper 12 is positioned in radial direction closer to the axis of rotation R of the (non-illustrated) brake disk than the other guide bolt—20—and/or the location hole thereof. In this constructional variant, the quadrangle having the corner points L, M, N, P that is defined by the four bolts and/or the location holes thereof is asymmetrical (see FIGS. 1 and 4).

Figure 4:
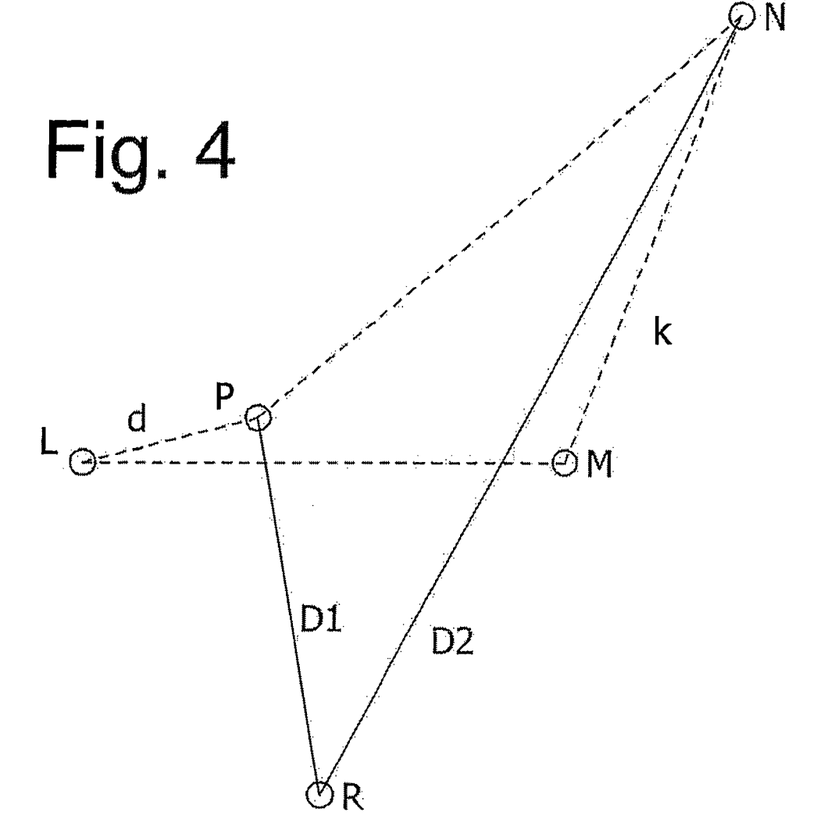
FIG. 4 is a diagrammatic representation of the geometry of the location holes of the guide bolts and the fastening bolts of the vehicle disk brake according to FIGS. 1 to 3.

The extent, by which the location hole P for the one guide bolt is to be positioned in radial direction closer to the axis of rotation R than the location hole N for the other guide bolt, is ca. 150% to ca. 50% of the distance of a location hole N for the other guide bolt from the location hole M directly adjacent thereto for a fastening bolt.

Referring to FIG. 4, the distance D1 of the location hole P for the one guide bolt from the axis of rotation R is reduced relative to the distance D2 of the other guide bolt from the axis of rotation R by ca. 90% of the distance k of the location hole N for the other guide bolt from the location hole M directly adjacent thereto for a fastening bolt.

As is shown likewise in FIG. 4, the distance d between the location hole P for the one guide bolt and the location hole L directly adjacent thereto for a fastening bolt is ca. 30% of the distance between the location hole N for the other guide bolt and the location hole M directly adjacent thereto for a fastening bolt.

Figure 5:
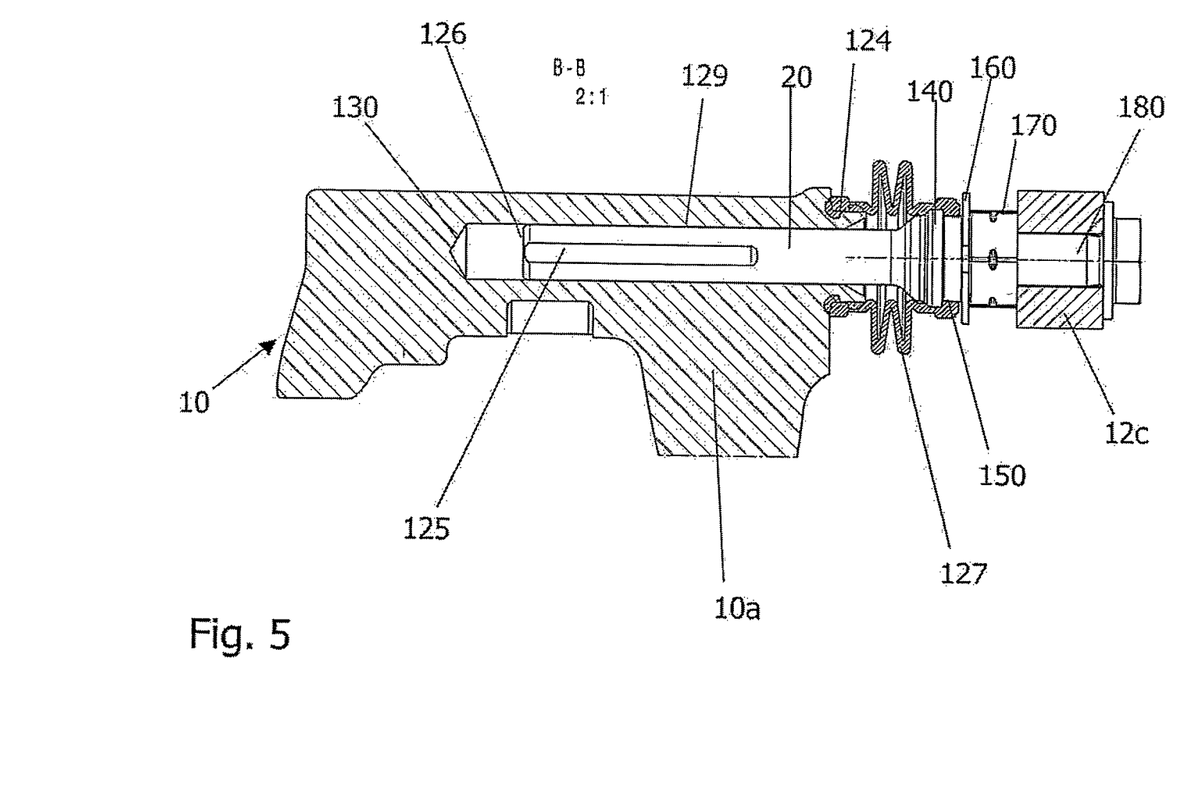
FIG. 5 is an enlarged longitudinal sectional view of a short guide bolt of the vehicle disk brake according to FIGS. 1 to 3.

The brake caliper 12 slides axially along the two guide bolts 20, 22 relative to the brake anchor plate 10. In this case, the guide bolt 20 designed as a pivot bearing is of a substantially cylindrical shape, wherein it conventionally has three flattened regions 125, which are distributed uniformly on the circumference and extend from the lead-in end 126 of the guide bolt to approximately half of the axial length thereof. These flattened regions 125 are used to form a gap between the surface of the guide bolt and the wall 129 of the location hole. Through this gap, during insertion of the guide bolt into the location hole, the air may escape from the chamber between the bottom 130 of the location hole and the end face 126 of the guide bolt. The flattened regions 125 are further used to enable a good distribution of lubricant along the shank of the guide bolt.

The guide bolt 20 has an upset, thickened head region 140, into which a groove 150 is cut. The groove lateral surface facing the shank of the guide bolt 20 is of a smaller outside diameter than the opposite groove lateral surface. The groove lateral surface with a larger outside diameter is part of a region of the guide bolt 20 that is configured as a protective disk 160. Adjoining the protective disk 160 is a hexagon insert head 170. It carries a non-illustrated threaded bore that is oriented coaxially with the shank of the guide bolt 20. With this threaded bore the brake caliper is screw-connected by means of a screw bolt 180. For this purpose, the brake caliper 12 has a flange 12c projecting in radial direction, in which a through-opening is provided for receiving the screw bolt 180.

A gaiter 127, which partially surrounds the guide bolt 20 in longitudinal direction, has on its one end a bead that is accommodated with initial tension in the groove 150. The bead effects sealing in this groove 150. The bead is protected by means of the protective disk 160 from being damaged by tools, which in the course of tightening the fastening screws during the fastening of the floating caliper at the end face of the guide bolt take up the torque from the screw connection acting upon the guide bolt. The brake anchor plate 10 has a groove 124 that extends coaxially with the location hole. The gaiter 127 on its other end has a further bead that is seated under initial tension in the groove 124.

Figure 6:
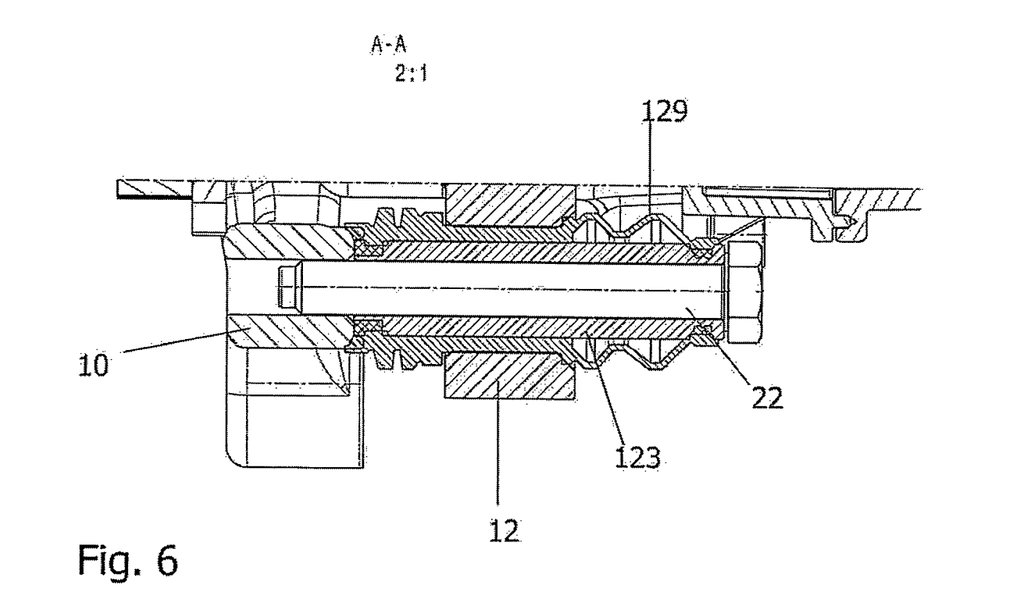
FIG. 6 is an enlarged longitudinal sectional view of a long guide bolt of the vehicle disk brake according to FIGS. 1 to 3.

FIG. 6 represents the supporting of the brake caliper 12 on the brake anchor plate 10 by means of the guide bolt 22, which is screwed into a location hole in the brake anchor plate 10. A sleeve 123 lies between the guide bolt 22 and the caliper 12. The sliding guide is sealed in a manner comparable to that for the other guide bolt 20 by means of a gaiter 129.

FIGS. 7-11 represent details of a second constructional variant. A brake anchor plate 10 manufactured from cast steel has two arms 10a, 10b. A brake caliper 12 overlaps the brake anchor plate 10. In the illustrated variants the brake caliper 12 takes the form of an integral floating caliper. The brake anchor plate 10 is fastened in a fixed manner to the chassis of a motor vehicle, for which purpose two holes 14a, 14b spaced apart by means of a web 16 as well as fastening screw bolts (not shown) are used.

Figure 7:
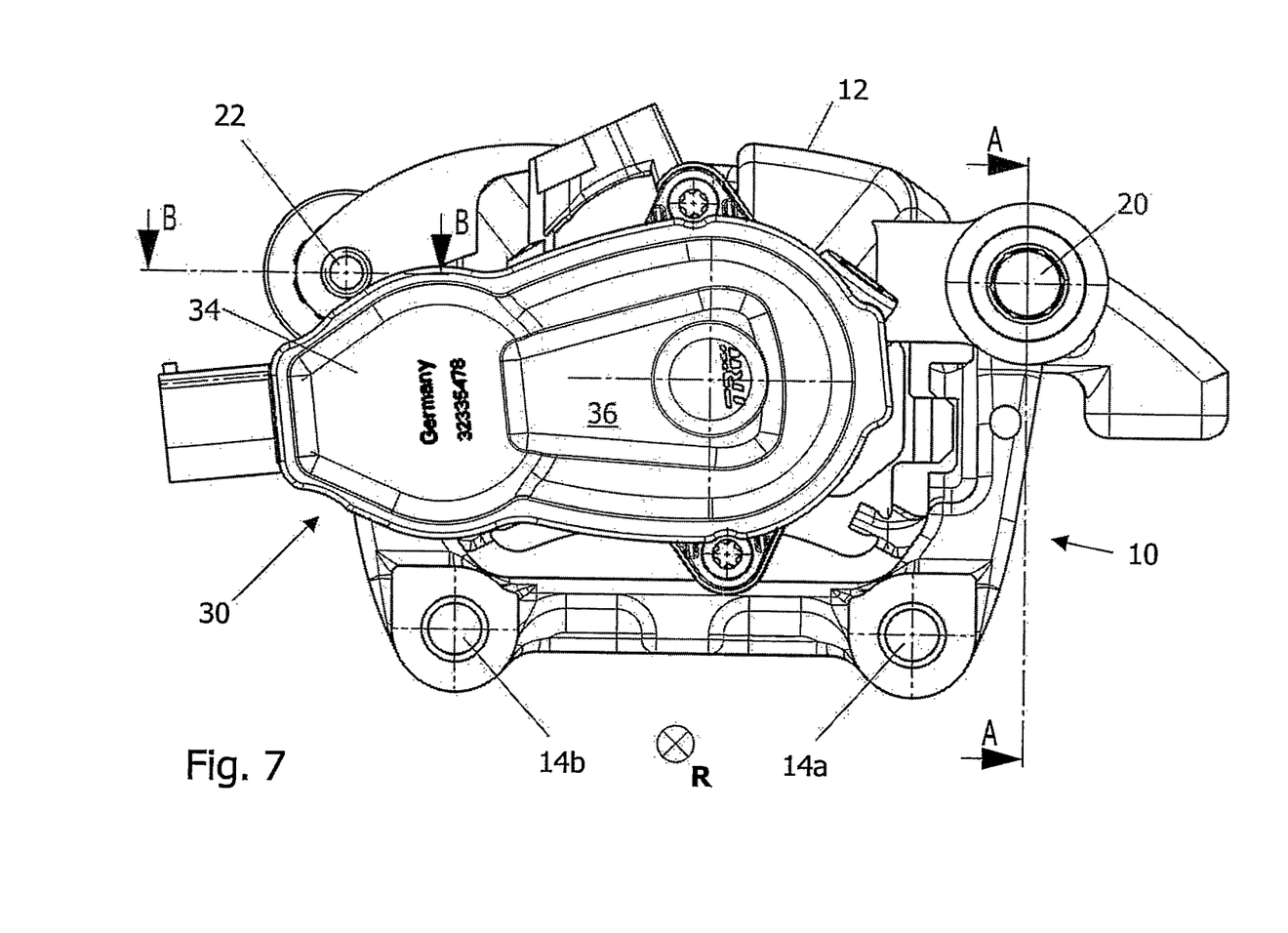
FIG. 7 is a second constructional variant of a vehicle disk brake in front view, i.e. in the assembled state seen from the outer side of the vehicle.
Figure 8:
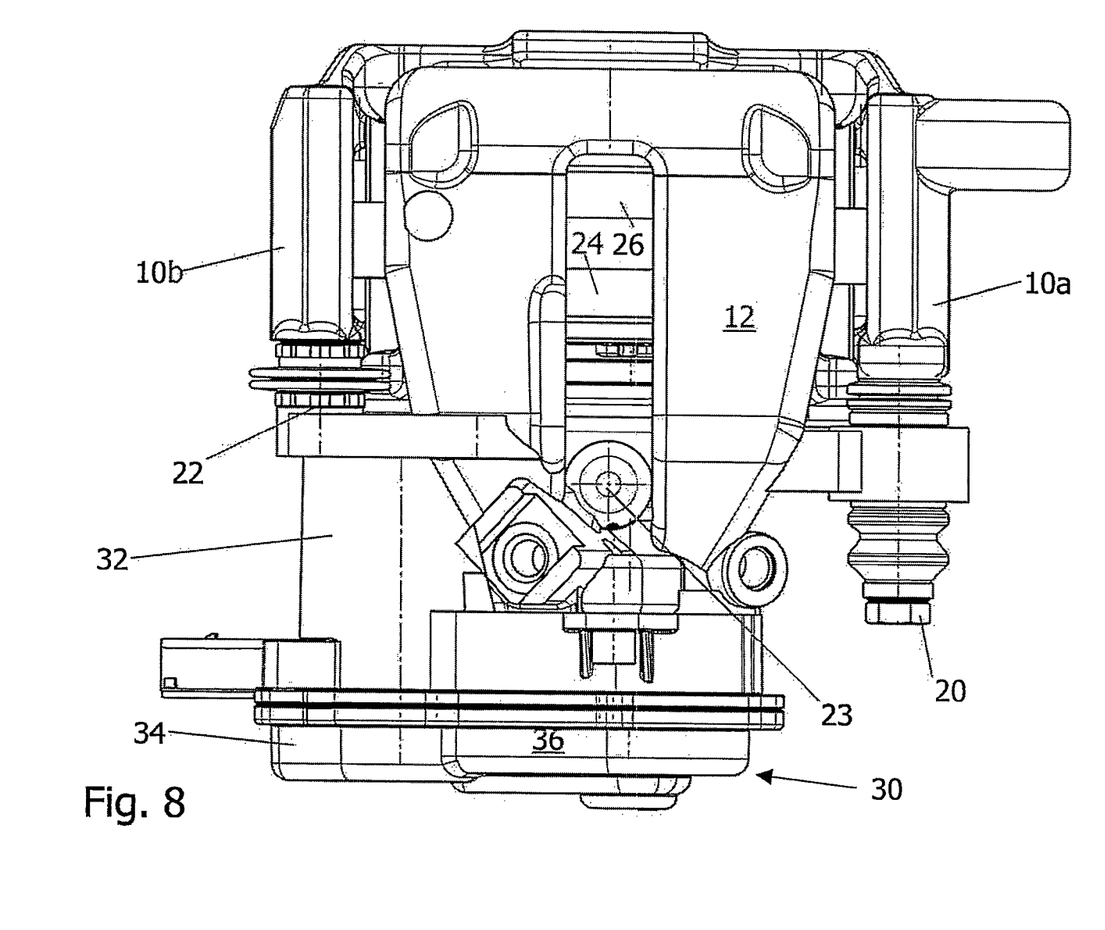
FIG. 8 is the vehicle disk brake according to FIG. 7 in plan view, from above towards the brake caliper.
Figure 9:
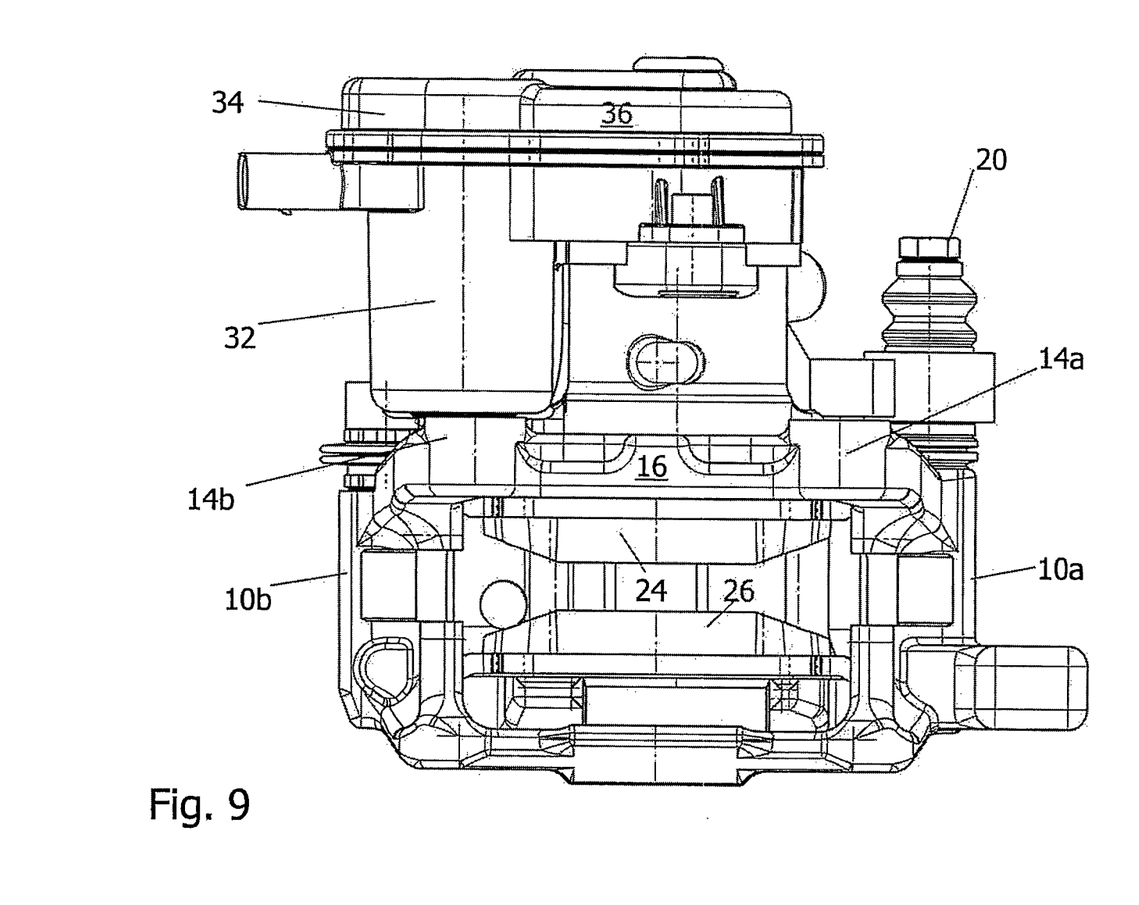
FIG. 9 is the vehicle disk brake according to FIGS. 7 and 8 from below towards the brake anchor plate.

In the brake anchor plate 10 two mutually spaced, substantially parallel-oriented guide bolts 20, 22 are accommodated in order to guide the brake caliper 12 relative to the brake anchor plate 10 in a longitudinally displaceable manner parallel to an axis R, wherein the axis R is the axis of rotation of a non-illustrated brake disk. Situated in the brake caliper is a non-illustrated hydraulic chamber, in which a non-illustrated brake piston is accommodated in a sealing and axially longitudinally displaceable manner. For supplying the hydraulic chamber with hydraulic fluid, on the outside of the brake caliper there is a port 23, which is in communication with a non-illustrated brake pressure generating unit, for example a brake booster/master cylinder unit that is actuable via a brake pedal.

Upon an actuation of the brake pressure generating unit the hydraulic fluid in the hydraulic chamber is pressurized, with the result that the brake piston shifts axially in order to bring friction linings 24, 26 into frictional engagement with the non-illustrated brake disk. When the actuation of the brake pressure generating unit is terminated, hydraulic fluid may flow out of the hydraulic chamber back in the direction of the brake pressure generating unit, with the result that the brake piston shifts back again in order to bring the friction linings 24, 26 out of engagement with the non-illustrated brake disk. A radially annular sealing element, which seals off the brake piston in the hydraulic chamber, assists the resetting of the brake piston by exerting an elastic resetting force on the brake piston in accordance with the "rollback" principle.

In order that the vehicle disk brake in this second constructional variant may not only perform the previously described function of a hydraulic service brake but may also be used as a parking- or immobilizing brake, a separately manipulable assembly 30 built onto the vehicle disk brake is provided. This assembly has an electric motor 32 as well as an associated integrated electronic control and power device 34 and a gear 26. This assembly is used, independently of the hydraulic actuation of the brake piston, to move the brake piston via a rotary-to-linear motion converter, for example a non-illustrated spindle/nut arrangement, in the sense of bringing the brake linings into and out of engagement with the brake disk. In this case, the rotary-to-linear motion converter may be associated likewise with the assembly, or may be separate therefrom. In either case, it is disposed downstream of the electric motor 32 and the gear 36. The rotary-to-linear motion converter may however also be integrated into the gear or be part of the gear 36.

The gear has a high overall reduction ratio of ca. 200:1. The assembly is a separately manipulable subassembly that may be combined not only with the illustrated vehicle disk brake but also with other disk brakes. The electric motor in this case may be disposed in such a way that its output shaft extends approximately parallel to the axis of displacement of the brake piston and exits from the housing of the electric motor at the side remote from the brake piston.

This arrangement is particularly space-saving. Alternatively, the electric motor may be disposed in such a way that its output shaft extends approximately at right angles to the axis of displacement of the brake piston. For further details of the arrangement of the vehicle disk brake reference is made to EP 0 996 560 A1, to the subject matter of which reference is hereby made in full.

In the second constructional variant it is provided that one of the two guide bolts—20—of the brake caliper 12 and/or one of the two fastening bolts in axial direction projects further in axial direction than the other guide bolt—22. The one of the two guide bolts 22 that projects to a lesser extent is devised so as to serve, in the absence of the other guide bolt 20, as a pivot bearing for the brake caliper with the parking brake assembly built thereon. The brake caliper 12 has two fastening flanges: a first fastening flange 12a, which is fastened by means of the guide bolt 20 to the arm 10a of the brake anchor plate 10, and a second fastening flange 12b, which is fastened by means of the other guide bolt 22 to the other arm 10b of the brake anchor plate 10. The guide bolt 22 projects to a lesser extent than the guide bolt 20. Furthermore, the head of the guide bolt 20 is provided with an external thread 200, which, in the removed state of the brake caliper 12 from the brake anchor plate 10, is to be screwed into a corresponding internal thread of a threaded bore 202 in the second fastening flange 12b. The guide bolt 20 is configured as a pivot bearing in that it is of a substantially circular-cylindrical shape and is accommodated in a correspondingly round location hole. The guide bolt 20 has flattened regions 125, which are distributed uniformly on the circumference and extend from the lead-in end 126 of the guide bolt over half of the axial length thereof. These flattened regions 125 are used to form a gap between the surface of the guide bolt and the wall 129 of the location hole. Through this gap, during insertion of the guide bolt into the location hole, the air may escape from the chamber between the bottom 130 of the location hole and the end face 126 of the guide bolt. The flattened regions 125 are further used to enable a good distribution of lubricant along the shank of the guide bolt.

Figure 10:
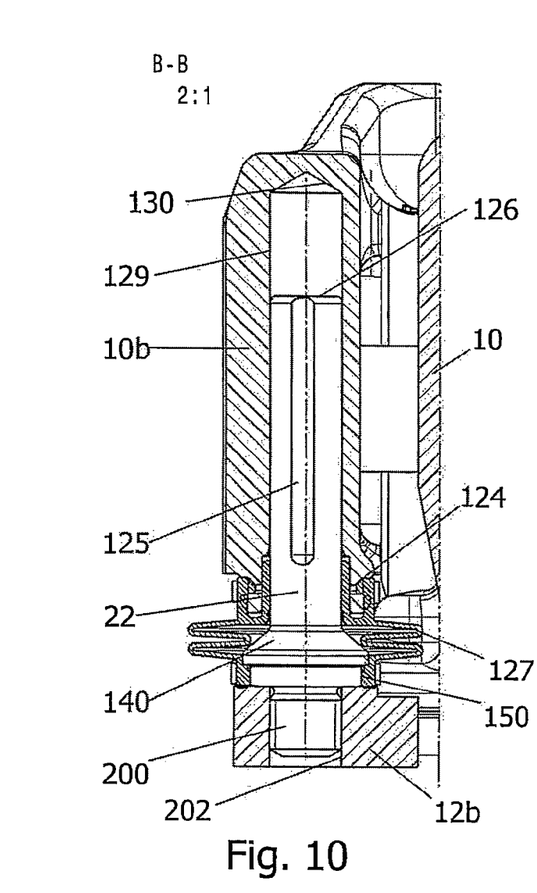
FIG. 10 is an enlarged longitudinal sectional view of a short guide bolt of the vehicle disk brake according to FIGS. 7 to 9.

The guide bolt 22 has an upset, thickened head region 140, into which a step 150 is cut. The groove lateral surface facing the shank of the guide bolt 20 serves as an abutment for a gaiter 127, which on its one end has a bead that is accommodated with initial tension against the step 150. The gaiter 127 on its other end has a further bead that is seated under initial tension in a groove 124 on the brake caliper 10 (see FIG. 11).

Figure 11:
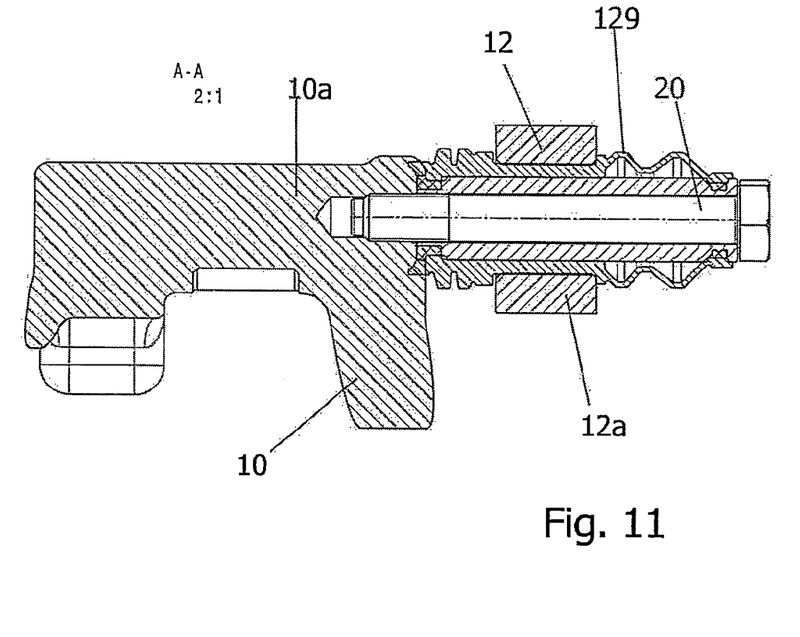
FIG. 11 is an enlarged longitudinal sectional view of a long guide bolt of the vehicle disk brake according to FIGS. 7 to 9.

FIG. 11 represents the supporting of the brake caliper 12 on the brake anchor plate 10 by means of the guide bolt 20, which is screwed into a location hole in the brake anchor plate 10. A sleeve 123 lies between the guide bolt 20 and the caliper 12. The sliding guide is sealed in a manner comparable to that for the other guide bolt 22 by means of a gaiter 129.

These two constructional variants of a vehicle disk brake designed as a service brake and as a parking- or immobilizing brake have a built-on, separately manipulable assembly, which has an electric motor for actuating this disk brake via a rotary-to-linear motion converter in the sense of bringing the brake linings into and out of engagement with the brake disk. In order to create the space required by the use of the assembly in the internal wheel contour of vehicles, in particular compact vehicles, modifications to existing and tried-and-tested components are undertaken, which simultaneously improve the accessibility for maintenance purposes.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. Vehicle disk brake, which is designed as a service brake and as a parking and/or immobilizing brake, comprising:
    a brake anchor plate, which is to be fastened to the chassis of a motor vehicle by means of first and second fastening screw bolts, and in the brake anchor plate first and second guide bolts are accommodated in order to guide a brake caliper displaceably relative to the brake anchor plate,
    an actuating element for bringing friction linings into and out of frictional engagement with a brake disk,
    a separately manipulable assembly that is built onto the vehicle disk brake and comprises,
    an electric motor in order via a rotary-to-linear motion converter to actuate the actuating element in the sense of bringing the brake linings into and out of frictional engagement with the brake disk,
    wherein
    a first location hole for the first guide bolt of the brake caliper is closer in radial direction to an axis of rotation of the brake disk than a second location hole for the second guide bolt, and wherein the first location hole for the first guide bolt is located on a first side of the axis of rotation of the brake disk and the second location hole for the second guide bolt is located on an opposite second side of the axis of rotation of the brake disk,
    wherein a first distance between the first location hole for the first guide bolt and a third location hole directly adjacent thereto for the first fastening screw bolt is ca. 10% to ca. 50% of a second distance between the second location hole for the second guide bolt and a fourth location hole directly adjacent thereto for the second fastening screw bolt.

2. Vehicle disk brake according to claim 1, wherein the service brake is a hydraulic service brake.

3. Vehicle disk brake according to claim 1, wherein the actuating element comprises a hydraulic chamber, in which a brake piston is accommodated.

4. Vehicle disk brake according to claim 1, wherein in the assembly built onto the vehicle disk brake an electronic control and power unit is at least partially accommodated for supplying the electric motor with control and/or power signals.

5. Vehicle disk brake according to claim 1, wherein the first and second fastening screw bolts and the first and second guide bolts and/or their location holes viewed in an axial direction define an imaginary asymmetrical quadrangle.

6. Vehicle disk brake according to claim 1, wherein one of the first and second guide bolts is disposed radially further in than the other.

7. Vehicle disk brake according to claim 6, wherein the first guide bolt disposed radially further in has a smaller diameter than the second guide bolt.

8. Vehicle disk brake according to claim 1, wherein the extent, by which the first location hole for the first guide bolt is to be positioned in radial direction closer to the axis of rotation of the brake disk than the second location hole for the second guide bolt is ca. 150% to ca. 50% of the distance of the second location hole for the second guide bolt from the fourth location hole directly adjacent thereto for the second fastening screw bolt.

9. Vehicle disk brake according to claim 1, wherein the brake caliper comprises a flange projecting in radial direction, in which a through-opening is provided for receiving a screw bolt.

10. Vehicle disk brake according to claim 9, wherein the second guide bolt comprises a head region, disposed in which is a threaded bore, which is oriented coaxially with a shank of the second guide bolt and to which the brake caliper is to be screw-connected by means of the screw bolt.

* * * * *